(12) United States Patent
Satou

(10) Patent No.: US 7,281,726 B2
(45) Date of Patent: Oct. 16, 2007

(54) WHEELED VEHICLE WITH ARM UNIT

(75) Inventor: Katsutoshi Satou, Shizuoka-ken (JP)

(73) Assignee: Yamaha Motor Co., Ltd., Shizuoka-ken (JP)

( * ) Notice: Subject to any disclaimer, the term of this patent is extended or adjusted under 35 U.S.C. 154(b) by 78 days.

(21) Appl. No.: 11/151,937

(22) Filed: Jun. 14, 2005

(65) Prior Publication Data
US 2005/0284681 A1   Dec. 29, 2005

(30) Foreign Application Priority Data
Jun. 23, 2004   (JP) ............................ 2004-185326

(51) Int. Cl.
*B62K 19/30* (2006.01)
*B62K 11/02* (2006.01)

(52) U.S. Cl. .................. 280/284; 280/285; 180/227

(58) Field of Classification Search ................ 280/284, 280/285; 180/227
See application file for complete search history.

(56) References Cited

U.S. PATENT DOCUMENTS 4,523,659 A * 6/1985 Yamamoto et al. ......... 180/227
5,255,932 A * 10/1993 Moore ...................... 280/281.1
6,219,919 B1 * 4/2001 Gogo et al. ................ 29/897.2
2005/0206122 A1 * 9/2005 Ichihara et al. ............. 280/284

FOREIGN PATENT DOCUMENTS

JP        2003-002274       1/2003

* cited by examiner

*Primary Examiner*—Lesley D. Morris
*Assistant Examiner*—Marlon Arce-Diaz
(74) *Attorney, Agent, or Firm*—Knobbe, Martens, Olson & Bear, LLP

(57) ABSTRACT

A wheeled vehicle includes a body frame, at least one wheel and an arm unit. A first end of the arm unit is supported by the frame body for pivotal movement about a pivot axis that extends generally horizontally and transversely. A second end of the arm unit rotatably carries the wheel. The arm unit defines an inner cavity that has first and second inner surfaces spaced apart from each other. The arm unit has a reinforcement that extends between the first and second inner surfaces.

17 Claims, 8 Drawing Sheets

WHEELED VEHICLE WITH ARM UNIT

PRIORITY INFORMATION

This application is based on and claims priority to Japanese Patent Application No. 2004-185326, filed Jun. 23, 2004, the entire contents of which is hereby expressly incorporated by reference.

BACKGROUND OF THE INVENTION

1. Field of the Invention

The present invention generally relates to a wheeled vehicle with an arm unit, and more particularly relates to a wheeled vehicle having an arm unit that carries a wheel of the vehicle.

2. Description of Related Art

Wheeled vehicles such as, for example, motorcycles have a plurality of wheels rotatably coupled with a body frame. Typically, motorcycles have front and rear wheels. A prime mover such as, for example, an engine powers the rear wheel. The front wheel usually is steerable by the rider.

In a typical motorcycle, a rear portion of the body frame has a generally horizontal pivot shaft that extends in a transverse direction. The pivot shaft supports a rear arm unit (or swing arm) for pivotal movement about a pivot axis defined the pivot shaft. That is, the rear arm unit can swing up and down about the pivot axis. The rear arm unit carries the rear wheel. The arm unit generally includes a pair of support sections through which the pivot shaft extends, a pair of arm sections that extend from the respective support sections to carry the rear wheel, and a connecting section that connects the respective arm sections with each other.

Recently, hydroforming has become practicable for producing motorcycle components. The components produced by hydroforming can be thinner and lighter than those produced by casting or other production processes. The arm unit, of course, can benefit from these advantages. Conventionally, however, a portion of the arm unit that needs to have increased rigidity is still produced by casting while the other portions can be produced by hydroforming. For example, JP2003-2274A discloses such an arm unit. Each arm section of the arm unit in this publication has a coupling portion with which the connecting section coupled. The coupling portions are produced by casting because the coupling portions require increased rigidity.

SUMMARY OF THE INVENTION

Generally, wheeled vehicles are required to be as lightweight as possible. Particularly, off-road motorcycles (for example, motocross motorcycles) need to be lighter for improved handling over rough and/or bumpy terrain. Thus, in an ongoing effort to reduce the weight of the motorcycle, the arm unit is a prime target. With respect to the arm unit, a majority of the arm sections can be produced by the hydroforming and then reinforced to improve rigidity.

Another problem, however, can arise. In particular, the arm unit for motorcycles, particularly, for off-road motorcycles, needs to maintain some level of flexibility. This is because the arm unit must absorb at least a portion of the shock received from the ground when the motorcycle lands after jumping into the air. Thus, the arm unit should accommodate two opposing requirements, i.e., rigidity and flexibility. A need exists for a wheeled vehicle having such an arm unit that can provide elements of both rigidity and flexibility in appropriate regions of the arm unit.

Therefore, an aspect of the present invention involves a wheeled vehicle comprising a body frame, at least one wheel, and an arm unit. A first end of the arm unit is supported by the frame body for pivotal movement about a pivot axis that extends generally horizontally and transversely. A second end of the arm unit rotatably carries the wheel. The arm unit defines an inner cavity that has first and second inner surfaces transversely spaced apart from each other. The arm unit has a reinforcement that extends between the first and second inner surfaces.

In accordance with another aspect of the present invention, a wheeled vehicle comprises a body frame, at least one wheel, and an arm unit supported by the frame body for pivotal movement about a generally horizontal pivot axis that extends in a generally transverse direction. The arm unit rotatably supports the wheel. The arm unit has a pair of arm sections. Each arm section defines an inner cavity that has opposing first and second inner surfaces that are spaced apart from each other. Each arm section has a reinforcement that extends between the first and second inner surfaces.

BRIEF DESCRIPTION OF THE DRAWINGS

These and other features, aspects and advantages of the present invention are now described with reference to the drawings of a preferred embodiment, which is intended to illustrate and not to limit the present invention. The drawings comprise eleven figures in which.

DETAILED DESCRIPTION OF PREFERRED EMBODIMENTS OF THE PRESENT INVENTION

Figure 1:
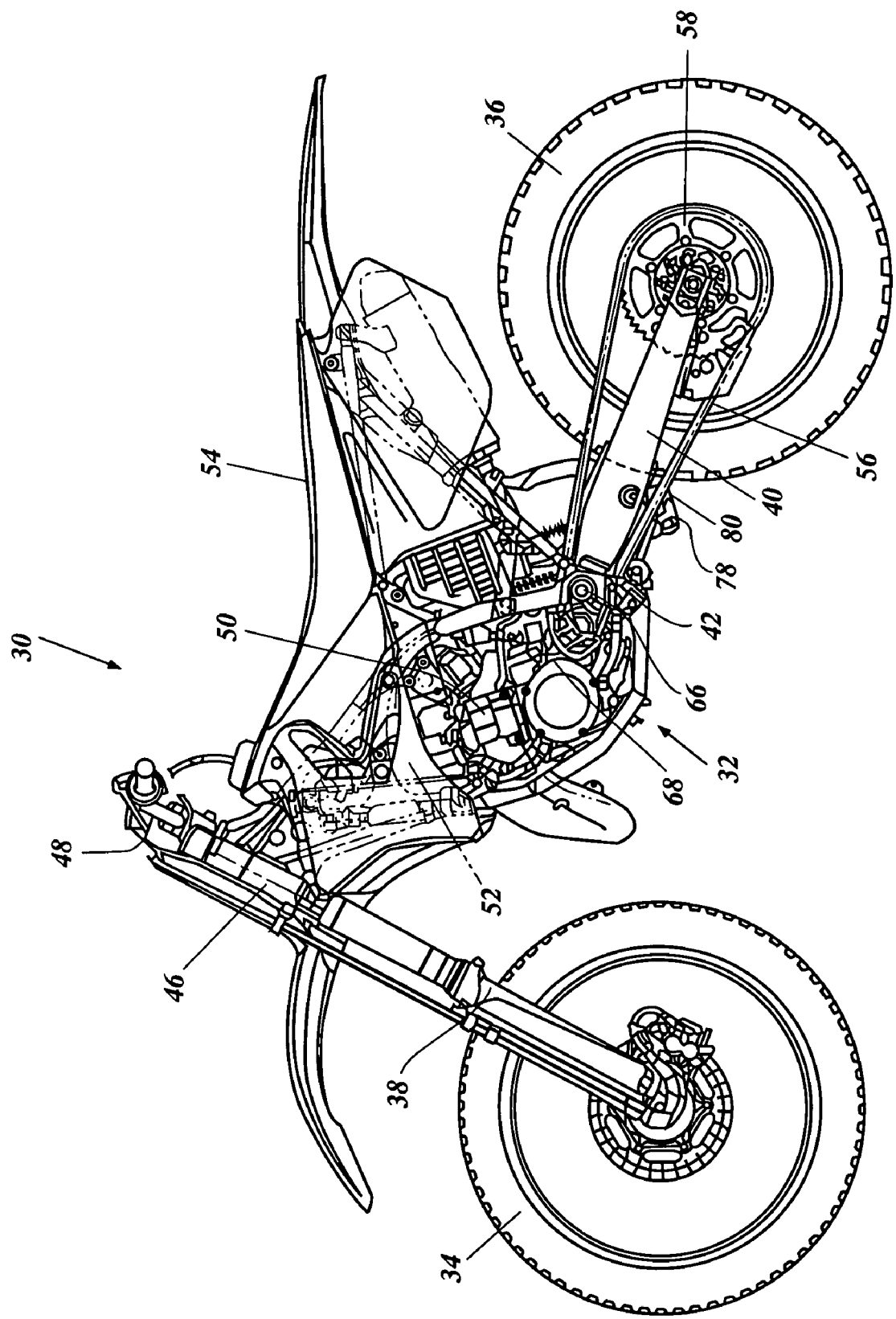
FIG. 1 illustrates a side elevational view of a motorcycle configured in accordance with a preferred embodiment of the present invention.
Figure 2:
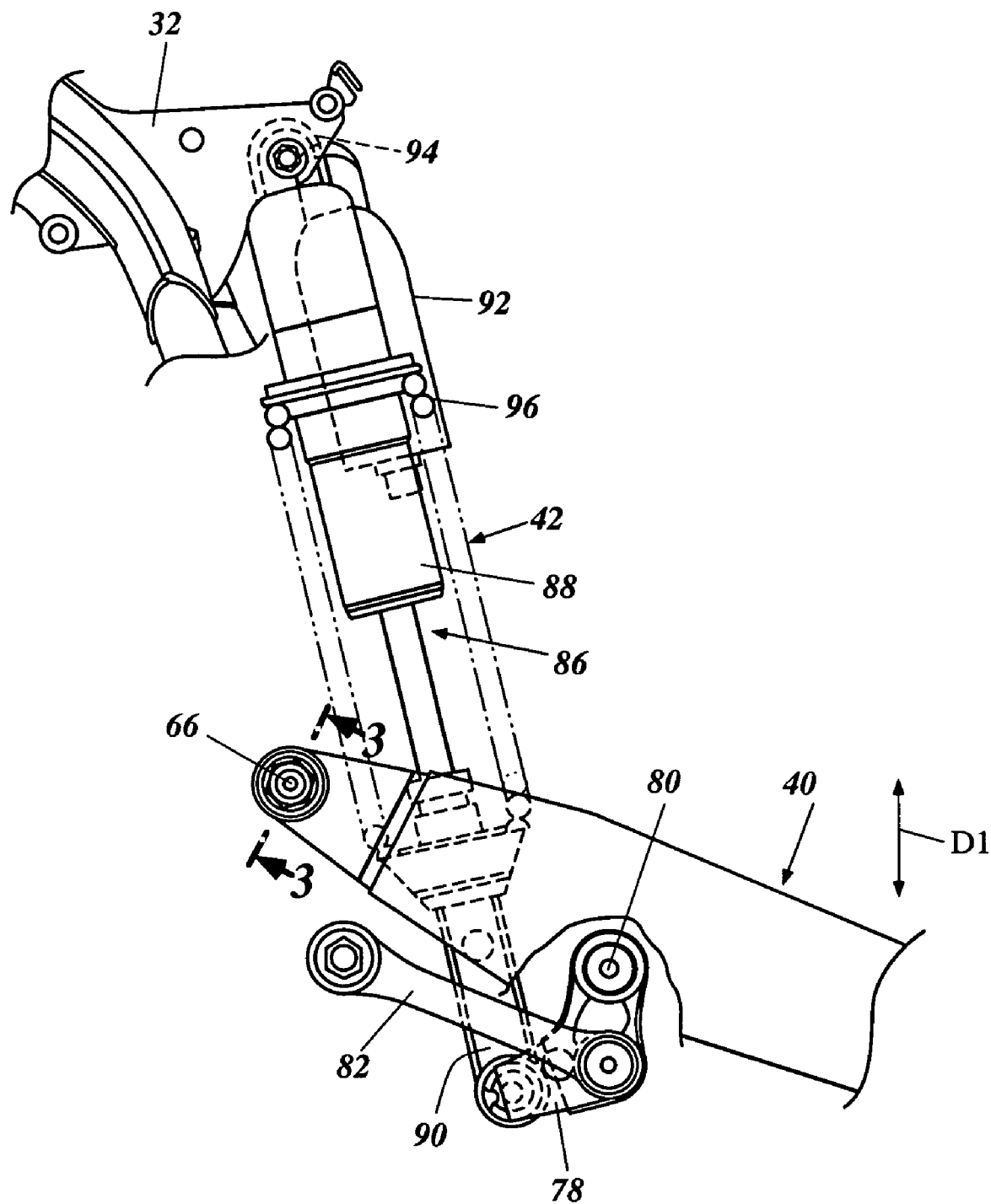
FIG. 2 illustrates a side elevational view of a rear cushion unit of the motorcycle of FIG. 1, interconnecting a body frame and a rear arm unit thereof.
Figure 3:
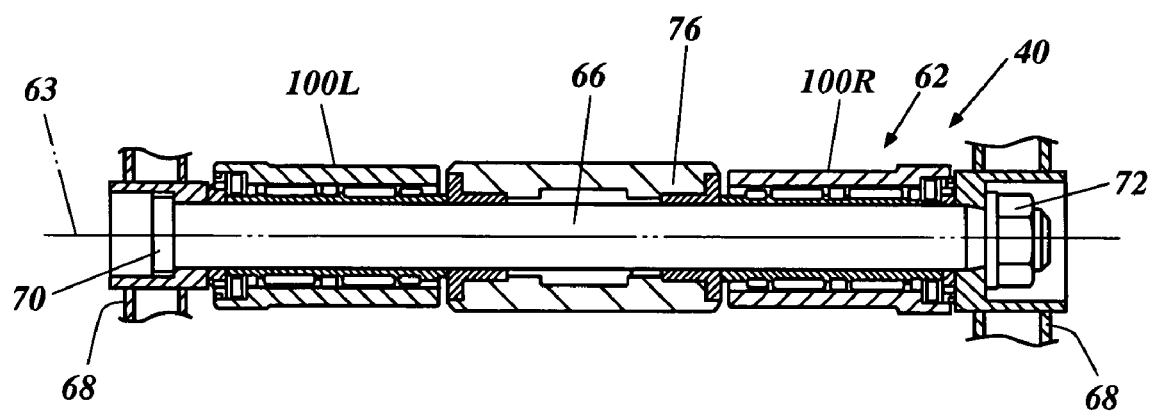
FIG. 3 illustrates a cross-sectional view taken along the line 3-3 of FIG. 2.

With particular reference to FIGS. 1-3, a motorcycle 30 configured in accordance with certain features, aspects and advantages of the present invention is shown. The illustrated motorcycle 30 is an off-road type and is particularly suitable for motocross. Motocross is a cross-country race for relatively lightweight motorcycles. Arm units described below have particular utility with the illustrated motorcycle 30. The motorcycle 30, however, merely exemplifies one type of a wheeled vehicle with which the arm units can have utility. The arm units can be applied to other types of motorcycles, and also can be applied to other wheeled vehicles such as, for example, motor scooters, mopeds and three or four wheeled ATVs (all terrain vehicles). Other applications may also become apparent based upon the disclosure contained herein.

The illustrated motorcycle 30 comprises a body frame 32 and first and second wheels 34, 36. As used throughout this description, the terms "forward" and "front" mean at or toward the end where the first wheel 34 is positioned, and the terms "rear" and "rearward" mean at or to the opposite end of the motorcycle 30, unless indicated otherwise or otherwise readily apparent from the context use. That is, the first wheel 34 is a front wheel and the second wheel 36 is a rear wheel. The illustrated body frame 32 is a semi-cradle type and is mainly formed with steel or aluminum alloy pipes. Other suitable frame constructions also can be used.

Also, as used in this description, the term "horizontally" means that the subject portions, members or components extend generally parallel to the ground when the motorcycle 30 is positioned normally on the ground. The term "vertically" means that portions, members or components extend generally normal to those that extend horizontally.

Further, as used throughout the description, the term "right hand side" means the side where the right hand of a rider of the motorcycle 30 is positioned when the rider is properly seated on the motorcycle 30, and the term "left hand side" means the side where the left hand of the rider is positioned.

The motorcycle 30 further comprises a front suspension system and a rear suspension system. In the illustrated embodiment, the front suspension system generally comprises a telescoping front fork assembly 38, and the rear suspension system includes a rear arm unit 40 and a rear cushion unit 42.

The front fork assembly 38 preferably is coupled with a head pipe 46 of the body frame 32 for pivotal movement about a steering axis. The front fork assembly 38 is connected with the front wheel 34. A handle bar 48 is preferably affixed to a top end of the front fork assembly 38 so that the rider can steer the front wheel 34 via the front fork assembly 38. The front fork assembly 38 advantageously has a damping structure to absorb at least some of the shock received from the ground. More specifically, the telescoping front fork assembly 38 allows the front wheel 34 to move up and down axially (i.e., in a direction corresponding to a caster angle) in response to a condition of the road surface. The front wheel 34 preferably is a wire-spoke type and has a relatively large tire suitable for motocross. Additionally, the rear wheel 36 preferably is the same type and has the same tire as the front wheel 34. Other configurations of the wheels 34, 36 also can be used.

A prime mover preferably is mounted on a mid portion of the body frame 32 and is placed inside of the cradle structure of the body frame 32. In the illustrated embodiment, an internal combustion engine 50 is used as the prime mover. The engine preferably is a single cylinder, water-cooled, two-stroke engine. A fuel tank 52 and a seat 54 are also mounted on the body frame 32 generally above the engine 50.

The engine 50 powers the rear wheel 36 via a suitable transmission that may include a clutching mechanism. In one configuration, a drive chain 56 preferably couples the transmission with the rear wheel 36 for driving the rear wheel 36. The rear wheel 36 preferably has a driven sprocket 56. The drive chain 56 wraps around the driven sprocket 56. Other transmission assemblies also can be used. For instance but without limitation, the transmission can be a shaft drive configuration.

The rear arm unit 40 is pivotally affixed to a portion of the body frame 32 (e.g., a rear portion). Preferably, a forward end (or first end) 62 (FIG. 4) of the arm unit 40 is supported by the body frame 32 for pivotal movement about a generally horizontal pivot axis 63 that extends in a generally transverse direction, while a rear end (or second end) 64 (FIG. 4) of the arm unit 40 supports the rear wheel 36.

As best shown in FIG. 3, a pivot shaft 66 is preferably affixed to a rear end 68 of the body frame 32 and a center axis of the pivot shaft 66 defines the pivot axis 63. The illustrated pivot shaft 66 has a flanged head 70, which has a hexagonal shape in the illustrated configuration, at one end and a threaded portion at the other end. The flanged head 70 engages with a left hand side portion of the rear end 68 of the body frame 32, and the pivot shaft 66 extends transversely to a right hand side portion of the rear end 68 of the body frame 32. A nut 72 is tightened onto the threaded portion to secure the pivot shaft 66 to the rear end 68. In the illustrated embodiment, a crankcase 76 of the engine 50 preferably has a tubular recess at its rear end. The tubular recess of the crankcase 76 supports a mid portion of the pivot shaft 66. The pivot shaft 66 pivotally supports the forward end 62 of the rear arm unit 40.

With reference to FIG. 2, the rear suspension system of the motorcycle 30 preferably is a linkage type monosuspension system. A portion of the rear arm unit 40 that is situated just behind the forward end 62 (FIG. 4) preferably is coupled with an L-shaped link 78 through a linkage bolt 80, which is affixed to the arm unit 40. The L-shaped link 78 preferably forms an isosceles triangle. The link shaft 80 is positioned at one of the vertexes of the triangle. A lever 82 preferably couples the L-shaped link 78 with a lower portion of the rear end 68 of the body frame 32 for pivotal movement. The illustrated lever 82 is connected to a vertex positioned next to the vertex for the link shaft 80.

The rear cushion unit 42 preferably couples the rear arm unit 40 with an upper portion of the rear end 68 of the body frame 32. Also, the cushion unit 42 allows the rear wheel 36 carried by the rear arm unit 40 to swing up and down relative to the body frame 32 so that at least a portion of the shock received by the rear wheel 36 can be absorbed. More specifically, a locus of the rear wheel axle is an arc that is almost equal to a line extending vertically. Thus, the movement of the rear wheel 36 can absorb the shock in a vertical direction indicated by the arrow D1 of FIGS. 2 and 4.

The rear cushion unit 42 preferably has a hydraulic damping mechanism 86 and a resilient member. The illustrated damping mechanism 86 is an inverted type and includes a single cylinder 88, a piston (not shown), a piston rod 90 and an accumulator 92. The piston is reciprocally disposed within the cylinder 88. Preferably, the piston rod 90 is affixed to the piston and extends out of the cylinder 88 beyond a lower end of the cylinder. A top end 94 of the cylinder 88 is preferably affixed to the upper portion of the rear end 68 of the body frame 32. A lower end of the piston rod 90 is preferably affixed to the vertexes of the link shaft 80. Preferably, the accumulator 92 is unitarily formed with the cylinder 88. Respective inner cavities of the cylinder 88 and the accumulator 92 communicate with each other. The cylinder 88 and the piston rod 90 have a retainer for each. The resilient member in the illustrated embodiment is a coil spring 96 extending between the retainers.

The full capacity of the cylinder 88 and a partial capacity of the accumulator 92 preferably contain a working fluid such as, for example, oil. The rest of the capacity of the accumulator 92 preferably contains a pressurized inert gas to pressurize the working fluid. The piston preferably has orifices and/or valves to regulate the flow of the working fluid passing therethrough. The coil spring 96 biases the piston rod 90 toward its fully extended position. As thus constructed, the flow of the working fluid and the coil spring 96 can absorb the shock.

Figure 4:
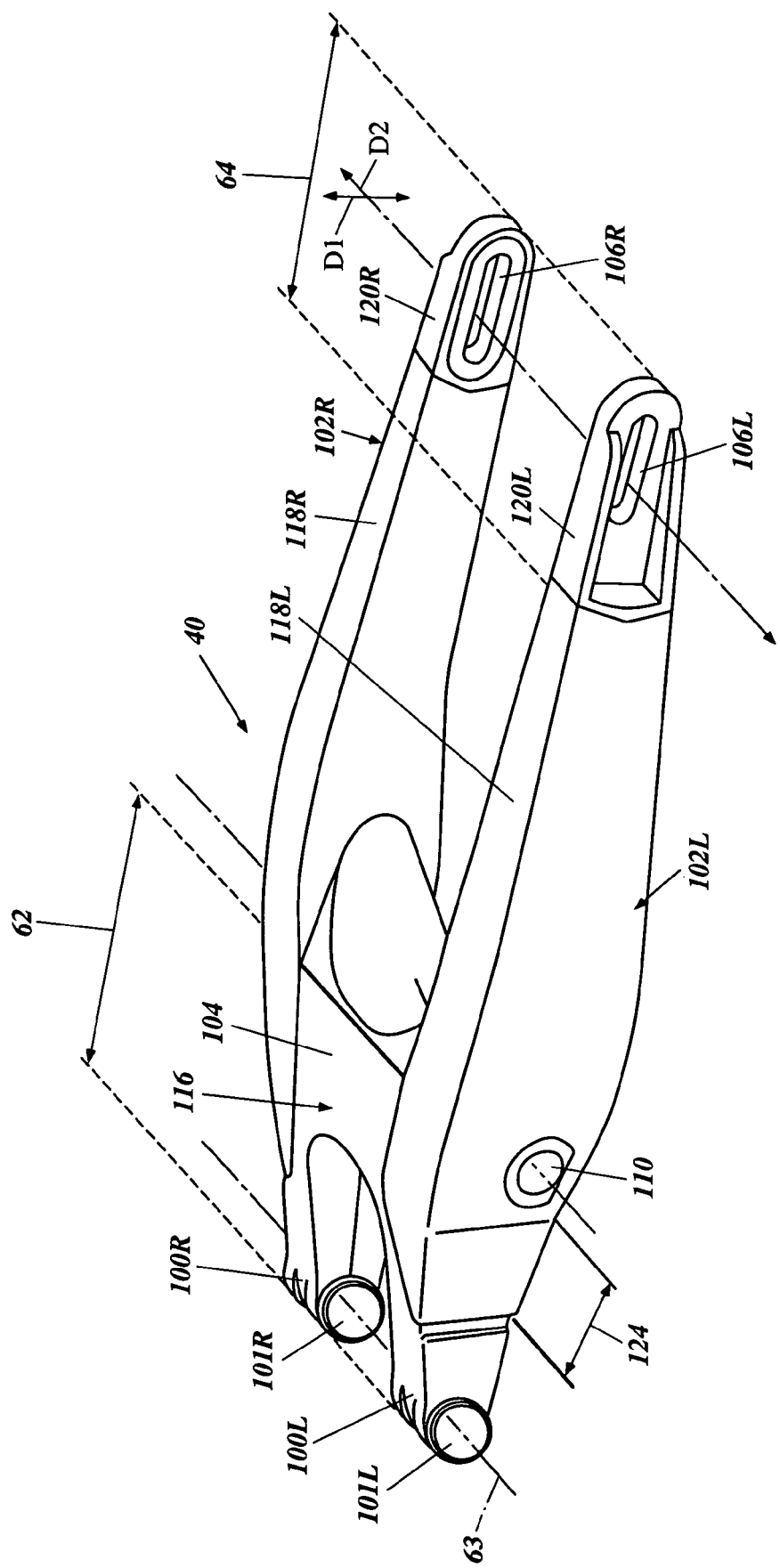
FIG. 4 illustrates a perspective view of the rear arm unit.
Figure 5:
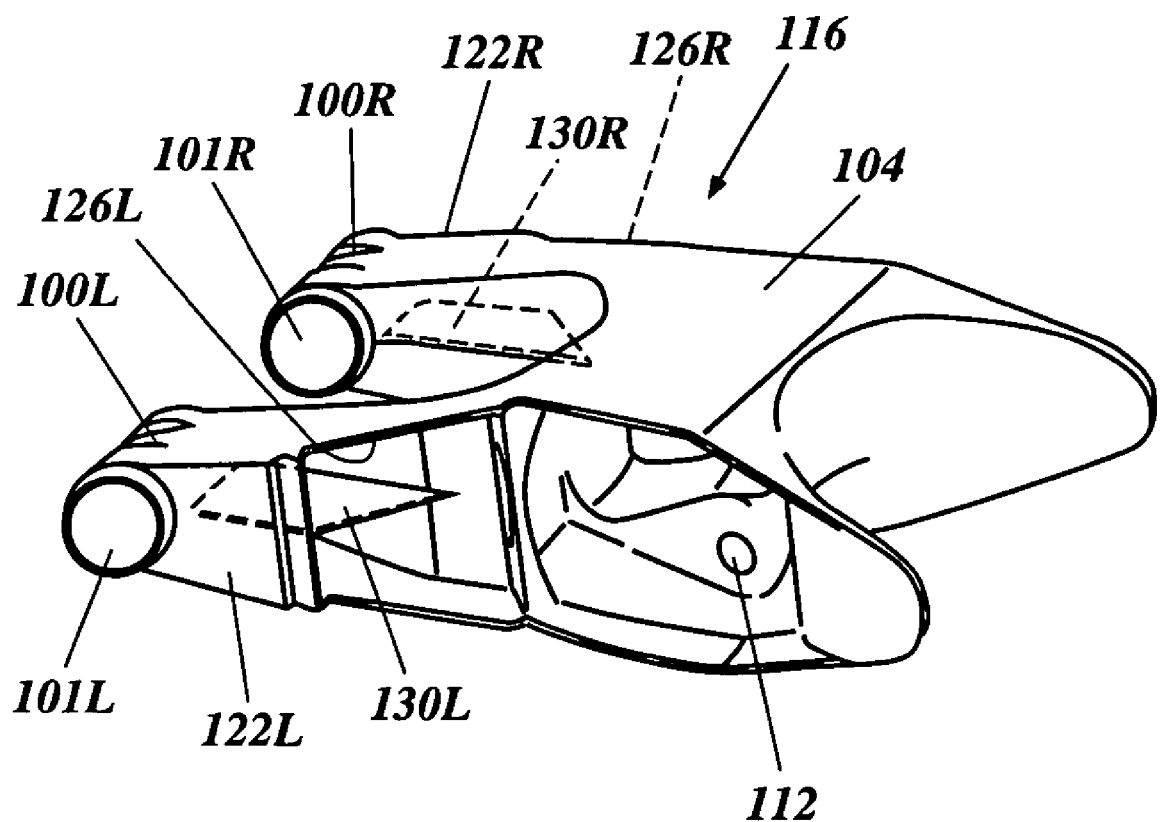
FIG. 5 illustrates a perspective view of part of the rear arm unit, i.e., a body member.

With reference to FIGS. 3-8, the rear arm unit 40 is described in greater detail below. With particular reference to FIG. 4, the rear arm unit 40 preferably comprises a pair of supported sections 100R, 100L, a pair of arm sections 102R, 102L and a connecting section 104. The supported section 100R and the arm section 102R are positioned on the right hand side, while the supported section 100L and the arm section 102L are positioned on the left hand side. The supported sections 100R, 100L preferably are supported by the body frame 32. More specifically, the supported sections 100R, 100L are tubular and are transversely spaced apart from each other. As shown in FIG. 3, the pivot shaft 66 extends through apertures 101R, 101L of the supported sections 100R, 100L.

The arm sections 102R, 102L extend rearward from the respective supported sections 100R, 100L. Each arm section 102R, 102L has an axle slot 106R, 106L at the rear end (second end) 64 thereof to carry the rear wheel 36. That is, the arm sections 102R, 102L are transversely spaced apart from each other and the rear wheel 36 is interposed therebetween. The axle slots 106R, 106L preferably are elongated along a hypothetical longitudinal center axis of the motorcycle 30 that extends fore to aft. In one configuration, the slots 106R, 106L has axes that are aligned with a plane defined between an axis of the rear axle and an axis of a drive sprocket, which is connected to the driven sprocket by the chain. The axle slots 106R, 106L provide a mounting location for the axle of the rear wheel 36. The connecting section 104 extends transversely between the respective arm sections 102R, 102L to interconnect those arm sections 102R, 102L.

In this description, the forward end 62 of the rear arm unit 40 is a forward area and includes the supported sections 100R, 100L and the major part of the connecting section 104. More specifically, the arm section 102L and the connecting section 104 have linkage bolt holes 110, 112 (FIGS. 5 and 6), respectively, through which the linkage bolt 80 extends. The forward end 62 is located forward of the linkage bolt holes 110, 112. Additionally, the arm section 102R also has a linkage bolt hole for the linkage bolt 80 and further has a recess for retaining a nut that is tightened onto the linkage bolt 80.

The rear end 64 of the rear arm unit 40 in this description is a rear area and includes the axle slots 106R, 106L and portions of the arm sections 102R, 102L which are located slightly forward of the axle slots 106R, 106L.

In the illustrated embodiment, the rear arm unit 40 is formed with five pieces, i.e., a body member 116, a pair of main arm members 118R, 118L and a pair of sub arm members 120R, 120L. Preferably, those members 116, 118R, 118L, 120R, 120L are made of aluminum alloy.

The body member 116 preferably forms the supported sections 100R, 100L and forward portions 122R, 122L of the respective arm sections 102R, 102L. The main arm member 118R and the sub arm member 120R together form the remainder of the arm section 102R, while the main arm member 118L and the sub arm member 120L together form the remainder of the arm section 102L. In the illustrated embodiment, the supported sections 100R, 100L, the forward portions 122R, 122L of the arm sections 102R, 102L and the connecting section 104 are unitarily formed. The sub arm members 120R, 120L are located in the area of the rear end 64.

Preferably, the body member 116 and the main arm members 118R, 118L are hollowed and define a common inner cavity when joined together.

Figure 8:
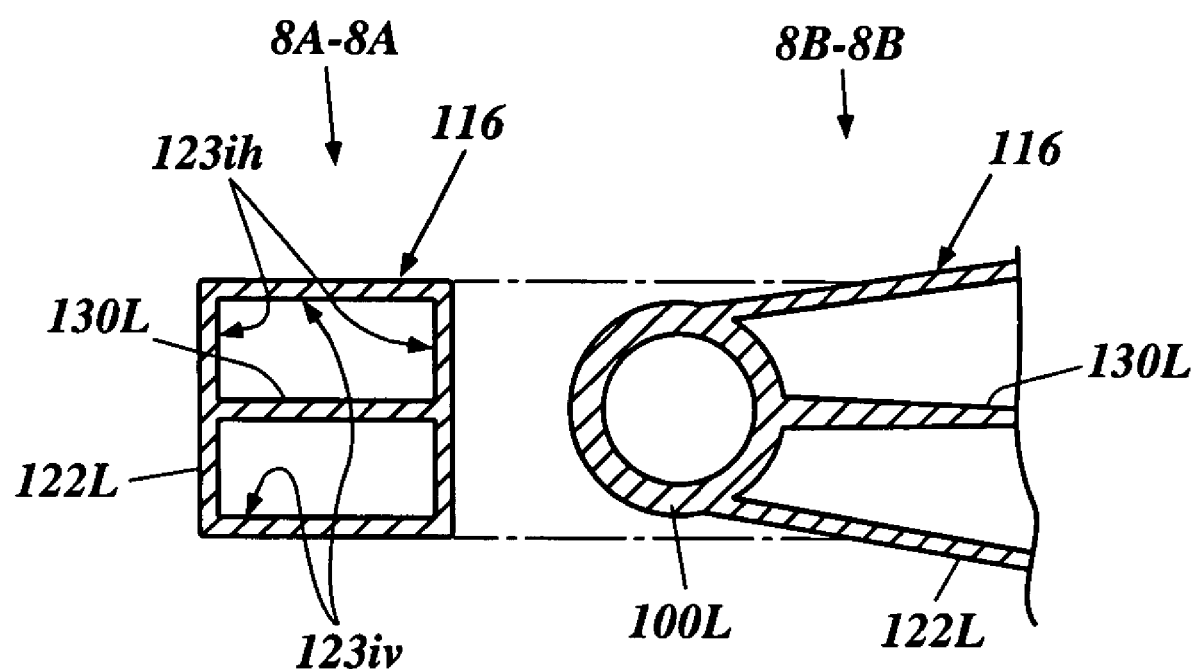
FIG. 8 schematically illustrates two cross-sectional views of the body member, one taken along the line 8A-8A of FIG. 7 and another taken along the line 8B-8B of FIG. 7, which are shown side by side.

With reference to FIG. 8, shown are two cross-sections representative of each forward portion 122R, 122L that are taken (1) parallel to the pivot axis 63 and (2) along a hypothetical vertical plane that extends generally vertically. The cross-sections, for example, are consistent with the lines (1) 8A-8A and (2) 8B-8B of FIG. 6. Preferably, the cross-section of each forward portion 122R, 122L generally defines a rectangular shape so that inner surfaces 123*ih* extend generally parallel to each other and also inner surfaces 123*iv* extend generally parallel to each other.

Figure 6:
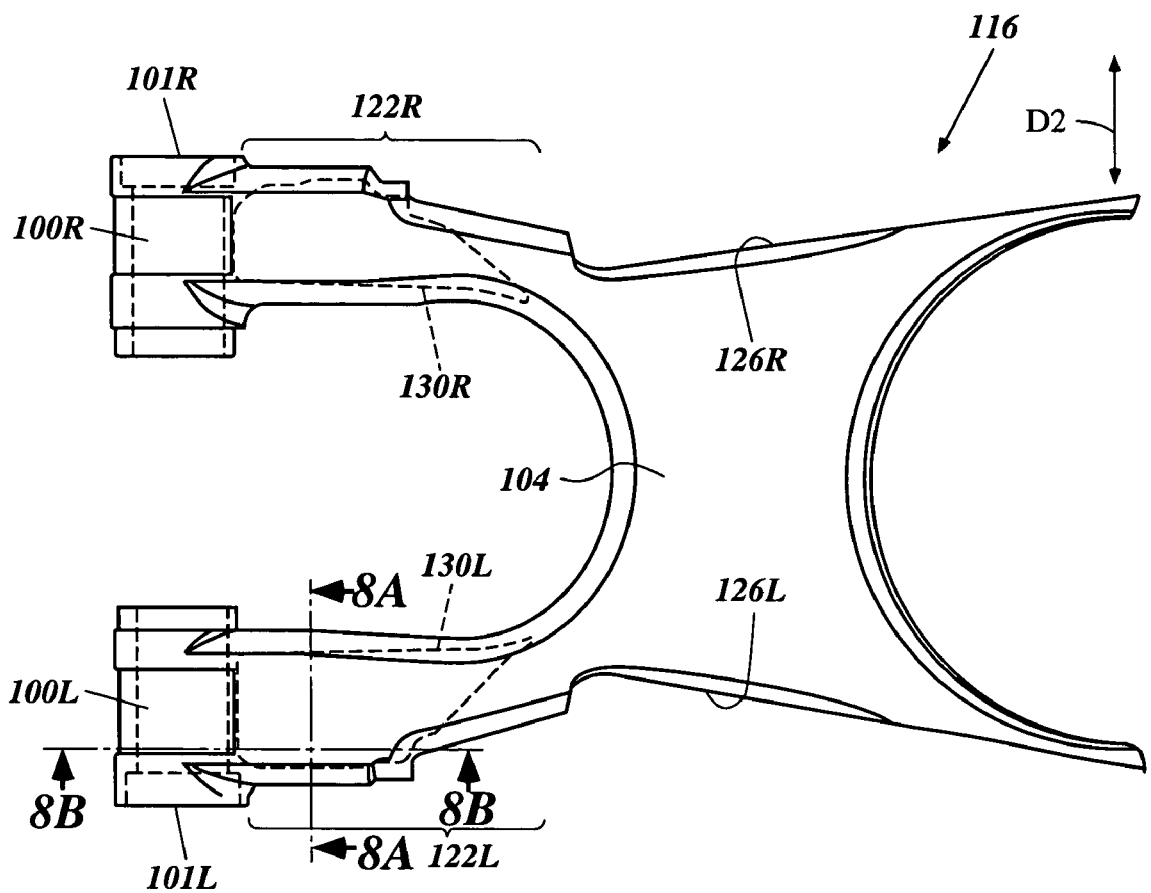
FIG. 6 illustrates a top plan view of the body member.
Figure 7:
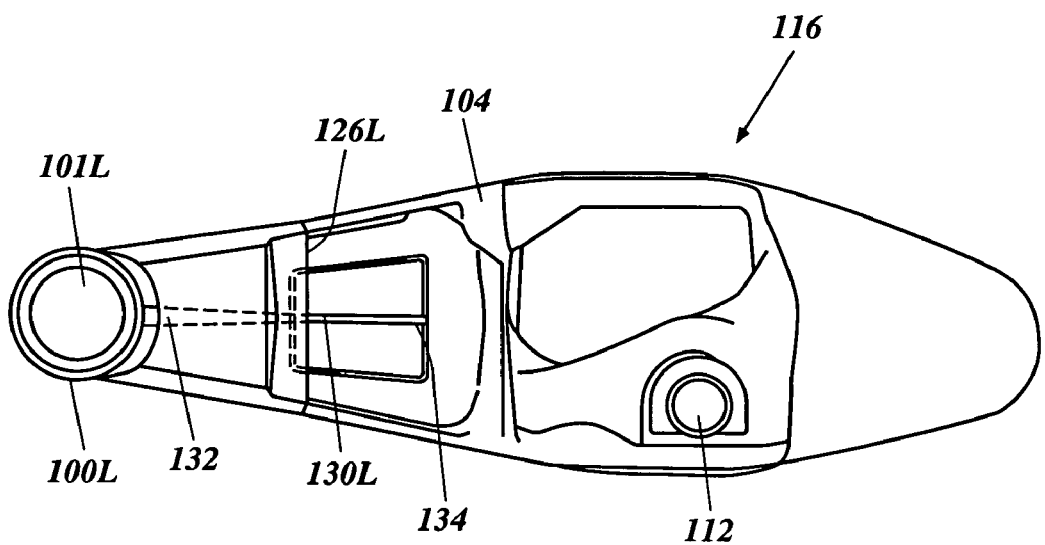
FIG. 7 illustrates a side elevational view of the body member on the left hand side.

With reference to FIGS. 4 and 6, the illustrated body member 116 preferably is recessed (i.e., transversely depressed) on both sides. In other words, the body member 116 comprises a recessed region (e.g., a concave region) on each lateral side. Respective front portions of the main arm members 118R, 118L preferably overlap at least a portion of the depressions of the body member 116. That is, each main arm member 118R, 118L has an area 124 located forward of the linkage bolt hole 110. In the illustrated arrangement, the area 124 corresponds to the front portions. Each depression defines an opening 126R, 126L, while a forward end of each main arm member 118R, 118L, which includes the area 124, has an opening (not shown). Because the main arm members 118R, 118L are coupled with the body member 116 with the openings aligned, the inner cavities of the main arm members 118R, 118L and of the body member 116 communicate with each other. Thus, the two cavities are joined to define a common inner cavity.

Preferably, each sub arm member 120R, 120L is produced by forging to provide sufficient rigidity or strength. On the other hand, the main arm members 118R, 118L are preferably produced by hydroforming. Hydroforming is well known and is a kind of sheet metal processing. More specifically, hydroforming is a kind of deep drawing (bulging). For example, a work piece (e.g., a piece of sheet metal or pipe) is placed in a cavity defined by multiple dies. The cavity generally has a closed cross-section. Water or other liquid is injected into the cavity under a relatively high pressure to press the sheet metal to the inner surface of the dies. Then, the water or liquid is released from the cavity and the work piece is removed from the dies. In the illustrated embodiment, the main arm members 118R, 118L are hydroformed. After the sub arm members 120R, 120L and the main arm members 118R, 118L are individually produced, the sub arm members 120R, 120L are welded to the associated main arm members 118R, 118L. Other suitable techniques can be used to join the sub arm members and the main arm members.

Each main arm member 118R, 118L produced by hydroforming can have a simpler configuration, yet remain sufficiently rigid. In other words, each main arm member 118R, 118L can be formed without particular reinforcements even though the thickness of the main arm members 118R, 118L can be reduced relative to the thickness of main arm members produced by other processes, such as, for example but without limitation, by swaging or casting. Accordingly, the completed main arm members 118R, 118L can maintain suitable flexibility, rigidity and strength. In addition, the main arm members 118R, 118L can help reduce the overall dry weight of the motorcycle 30.

The body member 116 preferably is made of aluminum alloy as discussed above. In the illustrated embodiment, an Al—Si—Mg aluminum alloy (AC4CH) is used. The body member 116 preferably is produced by casting. The main arm members 118R, 118L with the sub arm members 120R, 120L preferably are welded to the associated portions of the body member 116 such that the openings of the main arm members 118R, 118L meet with the openings 126R, 126L of the body member 116. Other suitable techniques can be used to secure the main arm members and the sub arm members.

As discussed above, in combination with the rear cushion unit 40, the rear arm unit 40 of the motorcycle 30 for motocross absorbs rather significant shocks from the ground, particularly after jumping in the air. In order to effectively absorb the shock, the rigidity of the rear arm unit 40 in the vertical direction, which is indicated by the arrow D1 of FIG. 4, preferably is less than a certain level. In other words, the rear arm unit 40 should have sufficient flexibility in the vertical direction D1. If the rigidity of the rear arm unit 40 in the vertical direction D1 is greater than a predetermined level (i.e., the flexibility in the vertical direction D1 is less than the predetermined level), the rear arm unit 40 is less likely capable of sufficiently absorbing the shock. The ease with which jumps can be landed is improved when the rear arm unit 40 is capable of adequately absorbing the shock.

On the other hand, the rear arm unit 40 should be sufficiently stiff in the horizontal direction, which is indicated by the arrow D2 of FIGS. 4 and 6, to maintain steering stability of the motorcycle 30. In other words, an overly flexible rear arm unit 40 can allow torsional deflection, which is undesirable to most riders.

Thus, the rear arm unit 40 needs to have a compromised construction to properly satisfy both the desire for flexibility in the vertical direction D1 and the desire for rigidity in the horizontal direction D2.

As described above, the main arm members 102R, 102L have some flexibility because the thickness can be reduced. Flexibility in the vertical direction D1, thus, is likely sufficient for suitably absorbing the shock. With respect to rigidity in the horizontal direction D2, the rear arm unit 40 preferably is reinforced. In the illustrated embodiment, the forward portions 122R, 122L of the respective arm sections 102R, 102L (i.e., forward portions 122R, 122L of the body member 116 located between the supported sections 100R, 100L and the connecting section 104) are reinforced.

With reference to FIGS. 5-8, each forward portion 122R, 122L preferably has a rib 130R, 130L extending between the vertical inner surfaces 123iv. Preferably, at least a portion of each rib 130R, 130L is positioned in the area of the forward end 62. More preferably, at least a portion of each rib 130R, 130L is positioned forward of the connecting section 104. In the illustrated embodiment, the entire rib 130R, 130L is positioned in the forward end 62 at a location forward of the connecting section 104.

Each rib 130R, 130L preferably has a thickness that is generally equal to the thickness of the surrounding wall portions of the body member 116. The illustrated rib 130R, 130L extends generally parallel to the horizontal inner surfaces 123ih and is generally equally spaced apart from the surfaces 123ih. Each rib 130R, 130L, however, does not necessarily extend parallel to the horizontal inner surfaces 123ih. Also, each rib 130R, 130L is not necessarily spaced apart equally from the surfaces 123ih.

The ribs 130R, 130L also extend generally horizontally fore to aft from the supported section 100R, 100L toward the connecting section 104, respectively. A forward end 132 of each rib 130R, 130L preferably is connected to a rear end of the supported section 100R, 100L. A rear end 134 of the rib 130R, 130L is obliquely shaped such that an inner side is longer than an outer side. In connection with the body member 116, each rib 130R, 130L is not necessarily wholly situated in the area which the cross-section is closed (e.g., a region defined by four outer walls as opposed to an area in which the cross-section is open—which would have only three or fewer outer walls if the body member 116 is a quadrilateral). The rear end 134 of the illustrated rib 130R, 130L is situated in an area which cross-section is open.

Each illustrated rib 130R, 130L is tapered toward the rear end 134 from the forward end 132. For example, the rear end 134 is approximately 0.3 mm thinner than the forward end 132. In some configurations, the rear end 134 can have the same thickness as the forward end 132, or the rear end 134 can be thicker than the forward end 132.

Preferably, the ribs 130R, 130L are cast unitarily with the other portions of the body member 116, i.e., with the supported sections 100R, 100L, the forward portions 122R, 122L and the connecting section 104. Slide cores, however, generally are necessary because the ribs 130R, 130L comprise under-cut portions that usually cannot be released from molds together with the balance of the body member 116.

The ribs 130R, 130L in the illustrated embodiment increase the rigidity of the rear arm unit 40 in the horizontal direction D2. In other words, the ribs 130R, 130L reinforce the rear arm unit 40 against torsional forces that otherwise could twist the arm unit 40. As a result, the rear arm unit 40 maintains sufficient flexibility in the vertical direction D1 with sufficient rigidity in the horizontal direction D2.

Also, each main arm member 118R, 118L in the illustrated embodiment comprises the area 124 located forward of the linkage bolt hole 110. The rear arm unit 40 thus is lighter than a rear arm unit in which an area corresponding to the area 124 is formed as a portion of the body member that is produced by the casting process. This is because the main arm member 118R, 118L including the area 124 is produced by hydroforming. As described above, a work produced by hydroforming can be lighter than a work produced by casting because the thickness can be reduced to a greater extent in a hydroformed product. Additionally, each rib 130R, 130L can be extended further rearward to reinforce the area 124 if the rigidity of the area 124 is otherwise insufficient. Each rib 130R, 130L preferably is situated only in the area of the forward end 62 in the illustrated embodiment. Thus, the illustrated ribs 130R, 130L do not unnecessarily reduce the flexibility of the rear arm unit 40 in the vertical direction D1.

Figure 9:
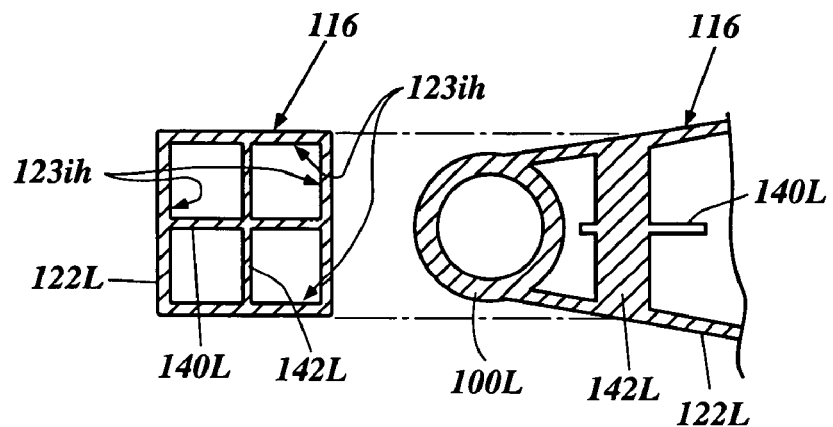
FIG. 9 schematically illustrates two cross-sectional views of another body member modified in accordance with a second embodiment of the present invention, wherein the cross-sectional views are shown in the same manner as FIG. 8.
Figure 10:
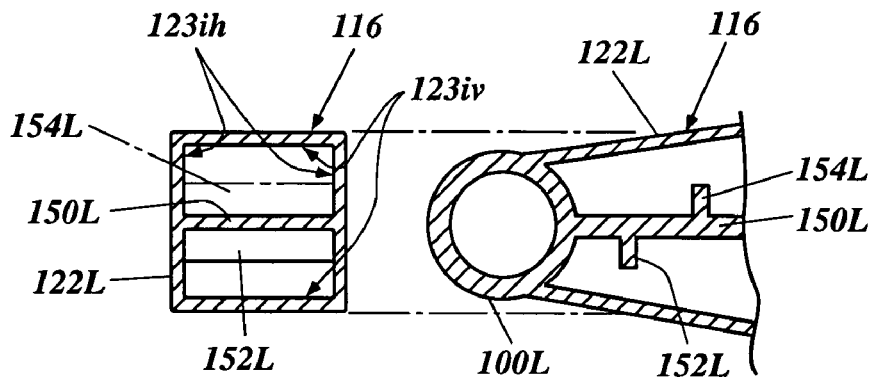
FIG. 10 schematically illustrates two cross-sectional views of a further body member modified in accordance with a third embodiment of the present invention, wherein the cross-sectional views are shown in the same manner as FIG. 8.
Figure 11:
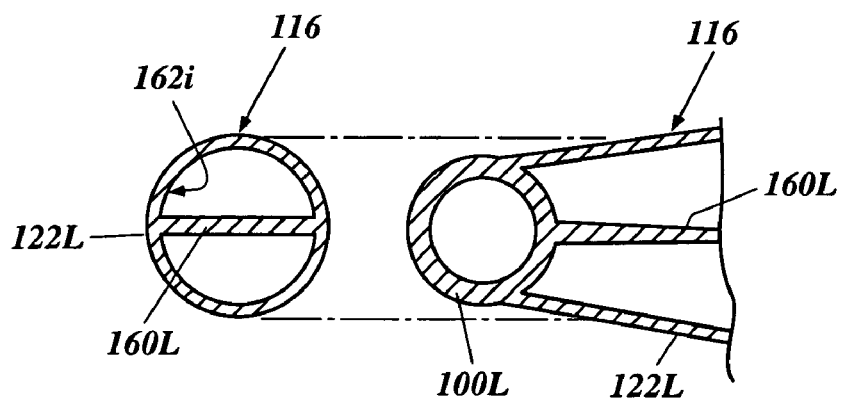
FIG. 11 schematically illustrates two cross-sectional views of a still further body member modified in accordance with a fourth embodiment of the present invention, wherein the cross-sectional views are shown in the same manner as FIG. 8.

Flexibility in the vertical direction D1 and rigidity in the horizontal direction D2 can be freely adjusted using reinforcements that have various configurations, dimensions, positions, thickness and so forth. For example, several such modified reinforcements are shown in FIGS. 9-11. Other configurations also are possible.

With reference to FIG. 9, another reinforcement modified in accordance with a second embodiment of the present invention is described. The same portions, members or components as those which have been described above are assigned the same reference numerals or symbols and are not described again. Because FIG. 9 illustrates cross-sections on the left hand side of the rear arm unit 40, a structure of the forward portion 122L is described below. It should be noted, however, that the structure on the right hand side typically will be the same as that on the left hand side and that the structure described below can represent either or both of the sides.

The forward portion 122L in this embodiment preferably has a rib 140L extending between the vertical inner surfaces 123*iv*. The rib 140L extends generally parallel to the horizontal inner surfaces 123*ih* and is generally equally spaced apart from the horizontal inner surfaces 123*ih*. Another rib 142L extends between the vertical inner surfaces 123*iv*. The rib 142L extends generally parallel to the vertical inner surfaces 123*iv* and is generally equally spaced apart from the vertical inner surfaces 123*iv*. Preferably, the ribs 140L, 142L intersect at a right angle with each other. Also, both of the ribs 140L, 142L preferably have an equal thickness. The thickness can be smaller than the thickness of surrounding wall portions of the body member 116 in this embodiment. Also, the horizontal rib 140L preferably is not tapered and the thickness thereof can be entirely uniform.

The horizontal rib 140L preferably extends generally horizontally fore to aft. The illustrated horizontal rib 140L, however, is not connected with the supported section 100L. A length of the horizontal rib 140L preferably is shorter than the horizontal rib 130L in the first embodiment (see FIG. 8). The vertical rib 142L also can extend generally vertically fore to aft. The illustrated vertical rib 142L also is not connected with the supported section 100L. Thus, the length of the vertical rib 142L is preferably shorter than the horizontal rib 140L.

The vertical rib 142L does not necessarily extend fully between the horizontal inner surfaces 123*ih*. For example, the vertical rib 142L can extend between one horizontal surface 123*ih* and the horizontal rib 140L. That is, the vertical rib 142L can be generally one half of the horizontal rib 140L. It should also be noted that the vertical rib 142L and the horizontal rib 130L can be sloped, angled or otherwise skewed from generally vertical or horizontal planes. Moreover, the ribs 130L, 142L can connect with the supported section 100L in some configurations.

With reference to FIG. 10, a further reinforcement modified in accordance with a third embodiment of the present invention is described. The same portions, members or components as those which have been described above are assigned the same reference numerals or symbols and are not described again. Because FIG. 10 illustrates cross-sections on the left hand side of the rear arm unit 40, a structure of the forward portion 122L is described below. It should be noted, however, that the structure on the right hand side typically will be the same as that on the left hand side and that the structure described below can represent either or both of the sides.

The forward portion 122L in this embodiment preferably has a rib 150L extending between the vertical inner surfaces 123*iv*. The rib 150L extends generally parallel to the horizontal inner surfaces 123*ih* and is generally equally spaced apart from the horizontal inner surfaces 123*ih*. The horizontal rib 150L also extends generally horizontally fore to aft toward the connecting section 104 from the rear end of the supported section 100L.

Another rib 152L extends vertically downward toward one of the horizontal inner surfaces 123*ih*, which is positioned at the bottom, from the horizontal rib 150L, and a further rib 154L extends vertically upward toward the other horizontal inner surface 123*ih*, which is positioned at the top, from the horizontal rib 150L. Preferably, both of the vertical ribs 152L, 154L do not reach opposing horizontal inner surfaces 123*ih*. Also, both of the vertical ribs 152L, 154L preferably are deviated from each other along the longitudinal center axis of the motorcycle 30. In the illustrated embodiment, the vertical rib 152L is positioned forward of the vertical rib 154L.

All the ribs 150L, 152L, 154L preferably have a thickness that is generally equal to the thickness of the surrounding wall portions of the body member 116. Also, the illustrated horizontal rib 150L is not tapered and the thickness thereof is entirely uniform. Other configuration, as described above, also can be used.

With reference to FIG. 11, a still further reinforcement modified in accordance with a fourth embodiment of the present invention is described. The same portions, members or components as those which have been described above are assigned the same reference numerals or symbols and are not described again. Because FIG. 11 illustrates cross-sections on the left hand side of the rear arm unit 40, a structure of the forward portion 122L is described below. It should be noted, however, that the structure on the right hand side typically will be the same as that on the left hand side and that the structure described below can represent either or both of the sides.

The forward portion 122L in this embodiment has a circular-shaped cross-section. In some configurations, the forward portion 122L is cylindrically shaped. In other configurations, the forward portion 122L is generally conical, and thus still has a circular cross-section. Other suitable cross-sections also can be used. A rib 160L extends horizontally between portions of an inner surface 162*i* of the forward portion 122L. More specifically, the portions of the illustrated inner surface 162*i* generally expand. The horizontal rib 160L also extends generally horizontally fore to aft from the rear end of the supported section 100L. The illustrated horizontal rib 160L is tapered rearward but need not be. The structure of this embodiment is similar in some respects to the structure of the first embodiment, except for the configuration of the forward portion 122L. It should be noted that the top and bottom areas of the inner surface 162*i* and right hand side and left hand side areas of the inner surface 162*i* can completely correspond to the horizontal inner surfaces 123*ih* and the vertical inner surfaces 123*iv* of the first embodiment.

Some aspects of the present invention can be applied to the front wheel if the front wheel has an arm unit similar to the rear arm unit instead of the front fork. Also, the arm unit can have a single arm section instead of the pair of arm sections. In this alternative, the arm unit can be considered a cantilever for carrying the wheel that extends only along one side of the wheel.

It should be noted that all the figures used in this description are more or less schematic, and dimensions and ratios among those dimensions can differ from those of real members, components or portions thereof.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described, other modifications, which are within the scope of this invention, will be readily apparent to those of skill in the art based upon this disclosure. It is also contemplated that various combination or sub-combinations of the specific features and aspects of the embodiments or variations may be made and still fall within the scope of the invention. It should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A wheeled vehicle comprising a body frame, at least one wheel, and an arm unit, a first end of the arm unit being supported by the frame body for pivotal movement about a pivot axis that extends generally horizontally and transversely, a second end of the arm unit rotatably carrying the wheel, the arm unit defining an inner cavity that has first and second inner surfaces transversely spaced apart from each other, and the arm unit having a reinforcement positioned within the inner cavity in the forward end of the arm unit, the reinforcement extending transversely between the first and second inner surfaces rearward to a location forward of a linkage bolt hole.

2. The wheeled vehicle as set forth in claim 1, wherein the inner cavity further has third and fourth inner surfaces vertically spaced apart from each other, and the reinforcement is spaced apart from both of the third and fourth inner surfaces.

3. The wheeled vehicle as set forth in claim 1, wherein the reinforcement is a first rib.

4. The wheeled vehicle as set forth in claim 3, wherein the arm unit further has a second rib extending toward the third or fourth inner surface from the first rib.

5. The wheeled vehicle as set forth in claim 4, wherein the second rib extends at least between the first rib and one of the third inner surface and the fourth inner surface.

6. The wheeled vehicle as set forth in claim 4, wherein the second rib extends between the third and fourth inner surfaces.

7. The wheeled vehicle as set forth in claim 1, wherein the reinforcement is positioned only in an area of the forward end of the arm unit.

8. The wheeled vehicle as set forth in claim 1, wherein the reinforcement is positioned adjacent to a supported section of the arm unit which is supported by the body frame for the pivotal movement.

9. The wheeled vehicle as set forth in claim 8, wherein the reinforcement is connected to the supported section.

10. The wheeled vehicle as set forth in claim 8, wherein the supported section is tubular, and a pivot shaft that defines the pivot axis extends through the supported section.

11. The wheeled vehicle as set forth in claim 1, wherein the arm unit comprises a pair of supported sections supported by the body frame for the pivotal movement, a pair of arm sections extending from the respective supported sections and carrying the wheel, and a connecting section interconnecting the respective arm sections, at least one of the arm sections has the reinforcement, and at least a portion of the reinforcement is positioned closer to the supported section than the connecting section.

12. The wheeled vehicle as set forth in claim 11, wherein each arm section comprises a first portion extending generally between the supported section and the connecting section, and a second portion extending from the first portion and carrying the wheel, and the reinforcement, the supported sections and the first portions are unitarily formed with each other.

13. The wheeled vehicle as set forth in claim 12, wherein the connecting section is further unitarily formed with the reinforcement, the supported sections and the first portions.

14. The wheeled vehicle as set forth in claim 1, wherein a cross-section of the arm unit taken along a hypothetical vertical plane that extends generally vertically and parallel to the pivot axis of the arm unit is closed, and the first and second inner surfaces are defined in the cross-section.

15. The wheeled vehicle as set forth in claim 14, wherein the cross-section generally defines a rectangular shape, and the first and second inner surfaces extend generally parallel to each other.

16. The wheeled vehicle as set forth in claim 14, wherein the cross-section generally defines a circular shape, and the first and second inner surfaces oppose to each other.

17. A wheeled vehicle comprising a body frame, at least one wheel, and an arm unit supported by the frame body for pivotal movement about a pivot axis that extends generally horizontally and transversely, the arm unit rotatably carrying the wheel, the arm unit having a pair of arm sections positioned forward of a linkage bolt, at least a portion of each arm section defining an inner cavity that has opposing first and second inner surfaces spaced laterally apart from each other, and said each arm section having a reinforcement that extends between the first and second inner surfaces.

* * * * *